UNITED STATES PATENT OFFICE.

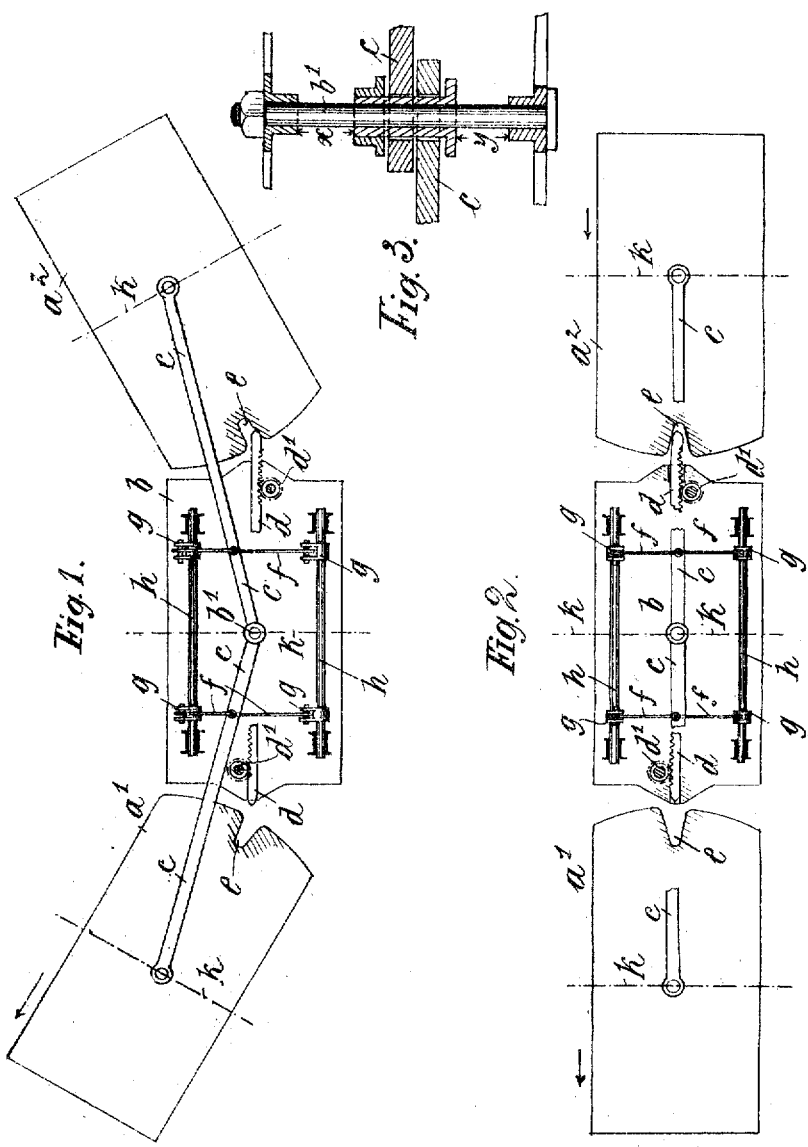

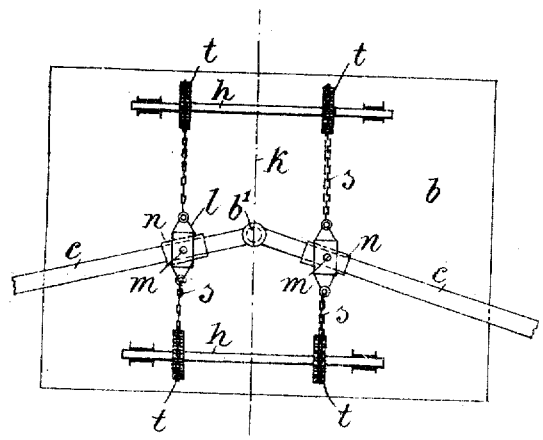
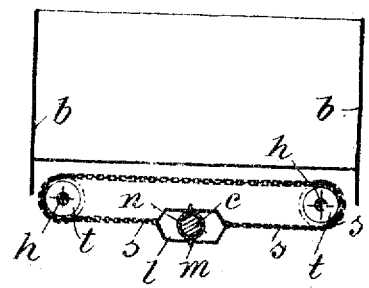

RICHARD JONAS, OF CHARLOTTENBURG, GERMANY, ASSIGNOR TO FREIBAHN GES. M. B. H., OF BERLIN, GERMANY.

STEERING OF COUPLED VEHICLES.

No. 902,821.  Specification of Letters Patent.  Patented Nov. 3, 1908.

Application filed February 7, 1908. Serial No. 414,848.

*To all whom it may concern:*

Be it known that I, RICHARD JONAS, engineer, and a resident of Charlottenburg, Germany, have invented certain new and useful Improvements in and Relating to the Steering of Coupled Vehicles, of which the following is a specification.

The present invention relates to a train of vehicles consisting of single axle two-wheeled vehicles or the like, connected together in sets of three by means of two links attached to central pivots, so as to form a threefold member.

The feature of the train forming the subject matter of this invention, is a special kind of dependency existing between the three vehicles combined to form one element, which dependency is such, that that member, which is first according to the direction of movement, is always free, while the two other members are in such connection, that they are always displaced in an antiparallel manner with regard to each other, the axle of the central member being compelled by means of a gear, preferably a sprocket wheel gear, to always halve the angle between the two links attached to its central pivot.

The connection for the members which, depending on the direction of movement, is in the rear, is preferably a single toothed gear and the tooth is made slidably adjustable in relation to a corresponding recess in the other member, so that the train is enabled to travel in two directions. If the coupling is in gear with the rear vehicle a close engagement of the flanks of the tooth is obtained in any position owing to its shape.

When rapidly traveling along an even road, the tooth may be moved a slight distance into the opposite recess of the front vehicle so as to prevent too great a freedom of movement and a consequent oscillating or rocking of the axles.

In the accompanying drawings two forms of carrying out the invention are shown diagrammatically.

Figure 1 shows one form of the invention in plan view, wherein the vehicles are shown rounding a curve in the direction of the arrow. Fig. 2 shows the triple element when traveling in a straight line. Fig. 3 shows a slidable guide device for automatically adjusting the axles when traveling over rough roads. Figs. 4 and 5 show the central vehicle according to a modification in plan view and section respectively.

The triple element of the train shown in Figs. 1 to 3, consists of a front member, $a^1$, a rear member, $a^2$, and a central member, $b$, each of which forms a single axle two wheeled cart or the like vehicle of a known type. The members, $a^1$, and, $a^2$, have the same shape while the central member, $b$, has a different and special shape. The carriage frame of this latter member is provided with a special gear which, in well known manner, will always adjust the axle of the wheels such that the angle between the links $c, c$ connected with it by means of the central pivot $b'$ will be halved. The gear shown by way of example in Figs. 1 and 2 consists of guide rods, $f$, which are pivoted at relatively corresponding places of the links, $c, c$, at both sides of the central pivot, $b^1$, and are attached to cranks, $g$, arranged on shafts, $h$, parallel to the longitudinal axis of the cart. Moreover toothed bolts, $d, d$, are slidably mounted on the central member, $b$, which bolts are to engage in corresponding recesses, $e, e$, provided in the adjacent ends of the vehicles, $a^1$, and, $a^2$. The bolts, $d$, are suitably actuated by means of toothed gearing, the pinions, $d^1$, of which are manipulated from the central vehicle.

As will be seen from the drawings the front vehicle, $a^1$, and the central member, $b$, are only connected with each other by means of the link or pivoted rod, $c$, which connects their central pivots, while the central member, $b$, and the rear vehicle, $a^2$, are in addition thereto coupled by means of the coupling, $d, e$, so that a kind of antiparallel dependency is obtained between the axles of, $b$, and, $a^2$.

Since the axle of the central vehicle or member, $b$, halves the angle between the two pivoted rods or links, $c$, each vehicle follows in the track of the preceding vehicle, when traveling in a straight line or when rounding a curve, with an exactitude which is sufficient in practice.

In the modification shown in Figs. 4 and 5, sprocket wheel gears are used for radially adjusting the axle of the central vehicle. From suitable positions on the links, $c$, symmetrically situated in relation to the central pivot, $b^1$, chains, $s$, pass over the sprocket wheels, $t$, mounted on the two shafts, $h$, arranged parallel to the longitudinal axis of the cart. In this manner two self-contained sprocket wheel gears are formed which are made dependent upon each other by the shafts, which gears effect an equal deflection or amplitude of the two links.

Each chain is suitably attached, as illustrated, to both ends of a frame, $l$, which is mounted on pivots, $m, m$, of a sleeve which slides on the pivoted rod or link, $c$.

In order to insure that all the wheels shall be in contact with the ground when traveling over very rough roads, slide guides are provided on the central vehicle, $b$, (Fig. 3). The heads of the links, $c, c$, mounted on the pivot, $b^1$, are made vertically adjustable in the upward direction by an amount equivalent to the distance, $x$, and vertically adjustable in the downward direction by an amount equivalent to the distance, $y$, in relation to the normal position. Thus it is possible that the central member, $b$, follows the unevennesses of the road without disturbing its connection with the outer members. For this reason, the single toothed connection is made sufficiently yielding or adjustable in a vertical direction by correspondingly dimensioning the height of the guides or recesses, $e, e$. Further, sufficient room for play is left at the pivots of the links, $c$, as may be seen from Fig. 3.

The toothing of the bolt, $d$, allows of a complete or a loose coupling by causing it to protrude or engage more or less into the recesses, $e$. It is advisable to employ the loose coupling for the front vehicle when traveling at a great speed in a straight direction. The rear member is always completely coupled.

The single central member could be substituted by a combination of two or more single carts, coupled together by links attached to central pivots and provided each with crank, sprocket wheel or the like gears for maintaining their axles in such position as to halve the angle between the said links, according to the central element in the arrangement shown in the drawing.

It is obvious that the sliding bolt, $d$, may be of a conical instead of tooth shape.

It is only necessary to couple together in the ordinary manner these members or elements connected with each other in threes so as to form a train.

Having now particularly described and ascertained the nature of my said invention and in what manner the same is to be performed, I declare that what I claim is:—

1. In a train comprising single axle two-wheeled vehicles connected together by means of links attached to central pivots so as to form triple elements, a guiding gear on the central vehicle of each triple element for maintaining the axle of this central vehicle in such a direction as to always halve the angle formed by the links attached to its pivot, and means for displacing the rear member in an antiparallel manner with regard to the central member.

2. In a train comprising single axle two-wheeled vehicles connected together by means of links attached to central pivots so as to form triple elements, a guiding gear for maintaining the axle of the central vehicle of each triple element in such a position as to always halve the angle between the links attached to its pivot, and a toothed gear engaging the central and the rear member.

3. In a train comprising single axle two-wheeled vehicles connected together by means of links attached to central pivots so as to form triple elements, a guiding gear for maintaining the axle of the central vehicle of each triple element in such a position as to always halve the angle between the links attached to its pivot, a slidable toothed bolt on the central vehicle and a corresponding recess on the rear vehicle for engaging the central and the rear member.

4. In a train comprising single axle two-wheeled vehicles connected together by means of links attached to central pivots so as to form triple elements, a guiding gear for maintaining the axle of the central vehicle of each triple element in such a position as to always halve the angle between the links attached to its pivot, a slidable toothed bolt at each end of the central member and a corresponding recess on each end member of the triple element.

5. In a train comprising single axle two-wheeled vehicles connected together by means of links attached to central pivots so as to form triple elements, a guiding gear for maintaining the axle of the central vehicle of each triple element in such a position as to always halve the angle between the links attached to its pivot, a slidable toothed bolt at each end of the central member and a corresponding recess on each end member of the triple element, the toothed bolts being of such shape and arrangement that the front member may be locked in relation to the central member leaving a little space for play, the loose engagement thus obtained serving for rapid traveling in a straight direction.

6. In a train comprising single axle two-wheeled vehicles connected together by means of links attached to central pivots so as to form triple elements, a sprocket wheel gear on the central vehicle in such connection with the links attached to its central pivot, that these links always form equal angles with the axle of the said vehicle.

7. In a train comprising single axle two-wheeled vehicles connected together by means of links attached to central pivots so as to form triple elements, two sprocket wheel gears symmetrically arranged in dependency of each other on the two sides of the central pivot of each central vehicle and connected with the links at points symmetrical to the central pivot.

8. In a train comprising single axle two-wheeled vehicles connected together by means of links attached to central pivots so as to form triple elements, two longitudinal shafts arranged on both sides of the central vehicle, two sprocket wheels on each shaft, symmetrically arranged to the vertical cross plane through the central pivot, the wheels on both shafts being opposite to each other, and a chain traveling over each pair of opposite wheels, which chains are connected with the links at symmetrical points.

9. In a train comprising single axle two-wheeled vehicles connected together by means of links attached to central pivots so as to form triple elements, two sprocket wheel gears symmetrically arranged in dependency of each other on the central element, the chains of which are attached to pieces which are free to rotate on the links in a horizontal direction and are also slidable in the longitudinal direction.

10. In a train comprising single axle two-wheeled vehicles connected together by means of links attached to central pivots so as to form triple elements, slidable guides on the central member for the purpose of allowing the central member to execute a movement in a vertical direction when traveling over rough roads, substantially as described.

11. In a train comprising single axle two-wheeled vehicles connected together by means of links attached to central pivots, so as to form manifold elements, a guiding gear on each of the middle vehicles of each manifold element for maintaining the axles of the middle vehicles of each manifold element in such a position as to always halve the angle between the links attached to their pivots, and a toothed gear engaging the last of the middle members and the rear member of each manifold element.

Signed at Berlin, Germany, this 24th day of January 1908.

RICHARD JONAS.

Witnesses:
HENRY HASPER,
WOLDEMAR HAUPT.